| United States Patent [19] | [11] Patent Number: 4,906,376 |
|---|---|
| Fyles | [45] Date of Patent: Mar. 6, 1990 |

[54] POLYMER MEMBRANE FOR PROTON DRIVEN ION TRANSPORT

[75] Inventor: Thomas Fyles, British Columbia, Canada

[73] Assignee: University of Victoria, Victoria, Canada

[21] Appl. No.: 323,195

[22] Filed: Mar. 13, 1989

Related U.S. Application Data

[63] Continuation of Ser. No. 929,288, Nov. 12, 1986, abandoned.

[30] Foreign Application Priority Data

Apr. 3, 1986 [CA] Canada ................................... 505815

[51] Int. Cl.$^4$ ........................ B01D 13/00; B01D 13/04
[52] U.S. Cl. ................................ 210/500.28; 204/296; 204/418; 210/506; 264/41; 264/204
[58] Field of Search ........................... 210/500.28, 506; 204/296, 418; 428/474.4, 480; 55/158; 264/41, 204

[56] References Cited

U.S. PATENT DOCUMENTS

| 4,235,717 | 11/1980 | Lee et al. | 210/685 |
|---|---|---|---|
| 4,376,100 | 3/1983 | Lee et al. | 423/179.5 |
| 4,452,702 | 6/1984 | Blasias et al. | 423/181 X |
| 4,460,474 | 7/1984 | Blasias et al. | 210/679 |
| 4,477,377 | 10/1984 | Izatt et al. | 210/651 X |
| 4,484,989 | 11/1984 | Mansell | 204/296 X |
| 4,636,286 | 11/1987 | DeLue et al. | 204/59 R |

OTHER PUBLICATIONS

Grant, J., *Hackh's Chemical Dictionary*, Fourth edition, p. 305, 1969.
Industrial & Engineering Chemistry, vol. 49, No. 11, Nov. 1957, pp. 1812–1819.
A. Zinke & F. Ziegler, Chem. Ber., 77, 264–272 (1944).
M. Yoshikawa et al., J. Membr. Sci., 20, 189–199 (1984).

*Primary Examiner*—W. Gary Jones
*Attorney, Agent, or Firm*—Birch, Stewart, Kolasch & Birch

[57] ABSTRACT

A functional membrane is provided for proton-driven ion transport. It consists essentially of a blend of two components. The first component is an active polymer having cation-binding sites, the cation binding sites being provided, e.g., by a crown ether, a cryptand or an acyclic complexone with an ionizable acidic site, e.g., a carboxylic acid, a sulfonic acid and a phenol, such active polymer being incorporated into a polymer backbone via a spacer component. The second component is a support polymer, e.g. a polyaramide, a polysulfone, or a polypip-erazine-fumaramide.

15 Claims, No Drawings

POLYMER MEMBRANE FOR PROTON DRIVEN ION TRANSPORT

This application is a continuation, of application Ser. No. 06/929,288 filed on Nov. 12, 1986, now abandoned.

BACKGROUND OF THE INVENTION (i) Field of the Invention

This invention relates to the recovery of metal ions from solutions containing other ions. More particularly, it relates to the use of polymeric membranes for proton-driven ion transport for a wide range of ion extraction and separation procedures.

(ii) Description of the Prior Art

Membrane processes have found commercial application in dialysis, desalination and gas separations and hold similar promise for several other separation processes including metal recovery and upgrading. Such membranes for metals recovery would replace conventional solvent extraction or ion exchange units by providing for the continuous removal of the desired metal ion through the membrane. Suitable membranes based on mobile carriers have been widely investigated for metals ranging from alkali metal and alkaline earth cations to copper, chromium and uranium.

One procedure adopted by the prior art is the use of ion retardation resins for desalting solutions. For example, Lee et al., in U.S. Pat. No. 4,235,717, patented Nov. 25, 1980, provided improvements in ion retardation resins e.g. those resins described in an article in Industrial and Engineering Chemistry, Vol. 49, No. 11, November 1957 (pp 1812-1819), titled "Preparation and Use of Snake Cage Polyelectrolytes" by Melvin J. Hatch, John A. Dillon, and Hugh B. Smith. The above patentee provided ion retardation resins said to be particularly useful for desalting caustic solutions which were prepared by employing ion exchange resins consisting essentially of a mixture of a reticular, insoluble, cross-linked styrene/divinylbenzene copolymer with an entrapped non-leachable polymer of acrylic acid, in which the acrylic acid groups on the polyacrylic acid were in substantial excess over the amount needed to react with all the quaternary ammonium groups, which were nuclear substituted on the styrene copolymer chains.

Lee et al., in U.S. Pat. No. 4,376,100, patented Mar. 8, 1983, provided a lithium halide brine purification procedure, i.e. the obtaining of high purity lithium halide solutions, through the use of resin/aluminate composites. This patentee provided an improvement in such procedure by means of a resin/aluminate composite which had been substantially loaded with $Li^+$ values by being contacted with a contaminated, $Li^+$-containing aqueous solution, then being prewashed with a substantially pure, concentrated NaCl brine to remove the contaminants without removing the $Li^+$ values and then being washed with water to leach out much, but not all, of the $Li^+$ values. The resin/aluminate composite used comprised a macroporous anion exchange resin having crystalline $LiX.2Al(OH)_3$ dispersed therein, where X was halide.

Another suggested technique for ion separation involved the use of a macrocyclic polyphenol (calixarene) ligand. These cyclic polyphenols comprising a specific type of ring of monomer units were first reported by A. Zinke and E. Ziegler, Chem. Ber., 77, 264–272 (1944). They are somewhat similar in structure to the cyclic polyethers and other macrocyclic ligands which are characterized by their size-related selectivity in binding cations.

Izatt et al., in U.S. Pat. No. 4,477,377 patented Oct. 16, 1984, provided a process of recovering cesium ions from mixtures of ions containing them and other ions, e.g., a solution of nuclear waste materials. The patented procedure involved establishing a separate source phase containing such a mixture of ions, establishing a separate recipient phase, establishing a liquid membrane phase, (contaning a ligand, preferably a selected calixarene) in interfacial contact with the source and recipient phases, maintaining such interfacial contact for a period of time long enough to transport, by the ligand, a substantial portion of the cesium ions from the source phase to the recipient phase, and recovering the cesium ions from the recipient phase.

Blasius et al., in U.S. Pat. No. 4,452,702, patented June 5, 1984, provided a process for the extraction of cesium ions from an aqueous solution with an adduct compound containing a macrocyclical polyether and an inorganic heteropoly acid component. An organic phase in the form of a solution of an adduct compound in a polar organic solvent was first prepared. The adduct compound was the product of a crown ether containing at least one species of particularly specified structural elements, with an inorganic heteropoly acid, which was stable in a strongly acid and oxidizing medium, or a salt of the inorganic heteropoly acid. The aqueous solution containing the cesium ions was brought into contact with the adduct compound to extract the cesium from the aqueous phase into the organic phase. The organic phase charged with cesium ions was then separated from the aqueous solution.

Also, Blasius et al., in U.S. Pat. No. 4,460,474, patented July 17, 1984 provided a process for the extraction of cesium ions from an aqueous solution with an adduct compound in solid form containing a macrocyclical polyether and an inorganic heteropoly acid. The adduct compounds employed comprised an adduct of (a) benzo-15-crown-5 (B-15-C-5); dibenzo-21-crown-7 (DB-21-C-7), or dibenzo-30-crown-10 (DB-30-C-10), with (b) 12-molybdophosphoric acid, 12-tungstophosphoric acid, 12-molybdosilicic acid, 12-tungstosilicic acid, or a sodium, potassium, tellurium or ammonium salt of any of these acids.

Liquid membranes (disclosed by the above prior art) are closely related to solvent extraction processes and potentially could suffer from degradation due to loss of the liquid membrane to the contacted aqueous phases on prolonged use. In contrast, polymeric membranes fabricated with the extractant as part of the membrane structure would not be susceptible to losses of this type. Those fixed site polymer membranes would be similar to conventional ion exchange membranes in which the extractant provides ion binding sites throughout the bulk of the membrane. The present invention aims to provide such an improvement in extraction techniques involving the use of crown ethers by providing such crown ethers in a more commercially viable form, i.e. in the form of a polymeric membrane with fixed sites.

Fixed site polymer membranes for anion transport are known which utilize a variety of polymeric heterocyclic bases as simultaneous proton and anion binding sites (see, for example, M. Yoshikawa et al., J. Membr. Sci. 20, 189–199 (1984) and reference therein). These membranes are capable of sustaining anion-proton cotransport (species move in the same direction) and can be utilized to "pump" anions against their concentration gradient using a pH gradient to drive the process.

SUMMARY OF THE INVENTION (i) Aims of the Invention

An object of the present invention is to provide a fixed site cation transport membrane in which proton-cation counter-transport (species moving in opposite directions) occurs, and which can be used to "pump" cations against their concentration gradients, similarly utilizing the pH gradient to drive the process. The membrane would thus provide both cation binding sites and ionizable groups.

(ii) Statement of Invention

The present invention provides such a transport membrane in which the cation binding site is a crown ether, and the ionizable group is a carboxylic acid. Proton loss and cation extraction at the basic interface initiate the process. The crown ether complex so formed is basic with respect to an adjacent crown ether and pairwise exchange of the cation and a proton moves the cation further into the membrane. A series of similar hops result in net transfer of a proton from acid to base with simultaneous transfer of a cation from base to acid.

Thus, the present invention provides a functional membrane for proton-driven ion transport consisting essentially of a blend of: (a) an active polymer having cation-binding sites, the cation binding sites being provided by a member selected from the group consisting of a crown ether, a cryptand and an acyclic complexone with an ionizable acidic site which is provided by a member selected from the group consisting of a carboxylic acid, a sulfonic acid and a phenol, such active polymer being incorporated into a polymer backbone via a spacer component; and (b) a support polymer selected from the group consisting of polyaramides, polysulfones and polypiperazine-fumaramides; thereby to provide a membrane whose constituents consist of such components (a) and (b).

(iii) Other Features of the Invention

By one feature of this invention, the active polymer preferably is a polymeric crown ether comprising a crown ether component chemically bonded to a polymer component via a spacer component, in which the crown ether component bears a carboxylic acid group or, together with the polymer backbone component, produces a carboxylate group. The active polymer may comprise: a copolymer selected from the group consisting of a crown ether with a polymeric acid chloride, and a crown ether with a polymeric cyclic anhydride, e.g., where the polymeric acid chloride is selected from the group consisting of polyacryloyl chloride, an acryloyl chloride-styrene copolymer, and an acryloyl chloride-methacrylate copolymer, or where the polymeric cyclic anhydride is selected from the group consisting of a copolymer of maleic anhydride with ethylene, a copolymer of maleic anhydride with methyl ether, and a copolymer of maleic anhydride with styrene. Preferably the crown ether component is one of the following:

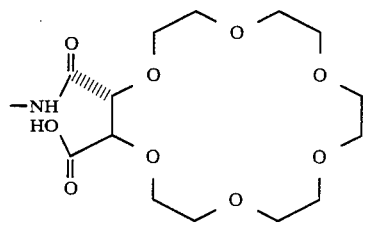

(designated 1a)

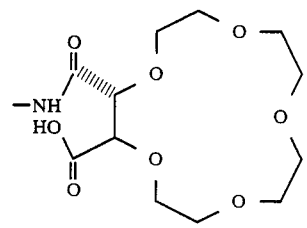

(designated 1b)

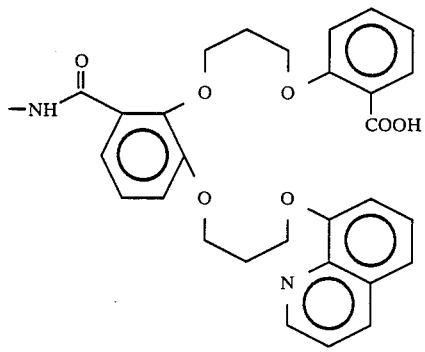

(designated 1c, i.e. an example of an acyclic complexing agent)

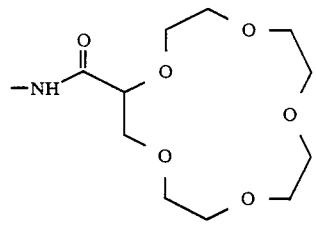

(designated 1d), and

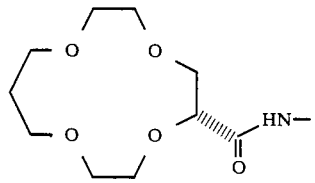

(designated 1e).

By another feature of this invention, it is preferred that the spacers be structional units which may be one of the following:

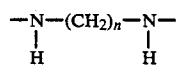

(wherein n=2, 3, 6 or 10); or

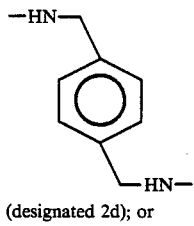

(designated 2d); or

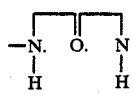

(designated 2e).

In yet another feature of the invention, the polymer backbone component may be selected from the group consisting of an acryloyl polymer, a methacryloyl polymer, a styryl polymer and a copolymer of maleic anhydride with ethylenes.

The support polymer preferably is either a polyaramide or a polysulfone. The support polymer further may be backed by a porous support, or may be a polyporous support member.

GENERAL DESCRIPTION OF THE INVENTION

To synthesize the active polymer, an amine-substituted crown ether derivative (or its acyclic relative) is reacted with a selected prepolymer to produce the polymeric crown ether. There are two-general types of prepolymers used, namely:

(1) polymeric acid chlorides

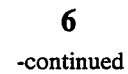

and (2) polymeric cyclic anhydrides.

The first are polymers of acryloyl chloride with or without methacrylate or styrene copolymerized. The second are copolymers of maleic anhydride with ethylene, methyl vinyl ether or styrene. The amine-substituted crown derivative may be prepared as described hereinafter.

The necessary crown ether anhydride and some of the other starting materials have been extensively described by the present inventor (See, Can. J. Chem. 62, 498 (1984) and references therein).

Two processes within the ambit of this invention used to produce such active polymers are shown below:

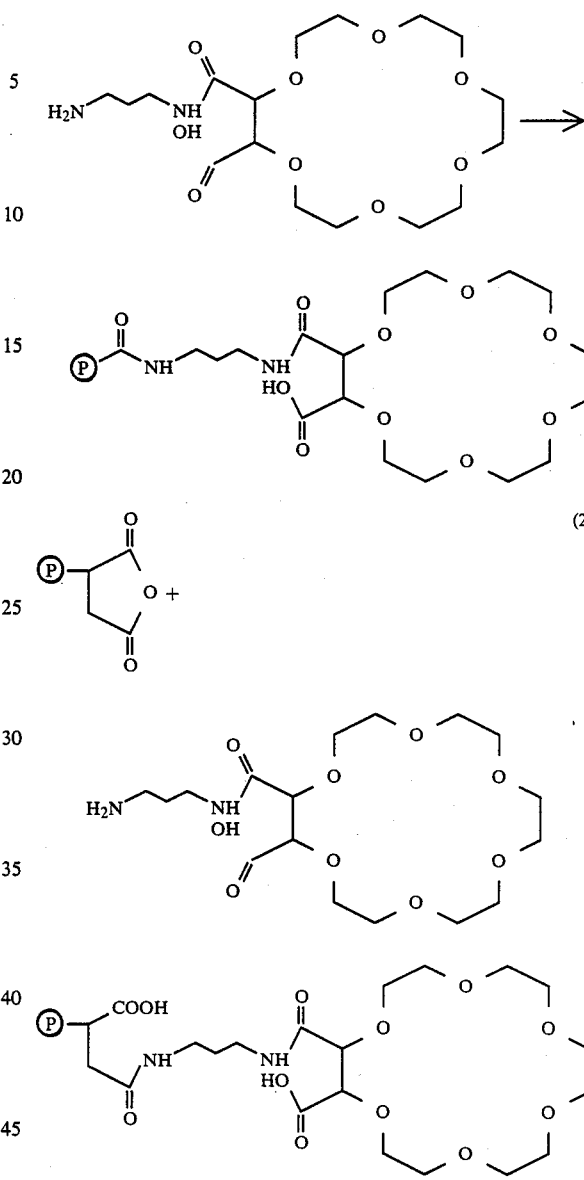

The functional membranes must be sheet materials suitable for mounting between two halves of a cell. As such, the membranes must support themselves. This is achieved by blending the active polymer with a polymer support material or blending and crosslinking the active polymer with a polymer material.

The support polymer is of the type providing a dense active layer on one face, backed by a porous support, e.g. a polymer selected from the group consisting of a polyaramide, a polysulfone, and a polypiperazinefumaramide. Alternatively, the support polymer maybe in the form a polyporous support member.

The functional membrane generally is cast from a solvent by phase inversion. Examples of such casting include the following: (a) from dimethylacetamide into water; (b) from dimethylacetamide and litium salts into water; (c) from dimethylformamide into water; (d) from dimethylformamide and lithium salts into water; (e) from dimethlacetamide and lithium salts into glycerol/water; (f) from formamide into water; (g) from dimethylsulfoxide into water; and (h) from dimethylacetamide/phenylethanol into water.

It is preferred that the support polymer be either a polyaramide or a polysulfone.

One of the techniques which has been found to be suitable is the blending with a support polymer, a method which utilizes polymers which are known to form membrane materials for reverse osmosis applications. Examples of two such materials include UDEL (a trade mark of Union Carbide for a polysulfone) and NOMEX (a trade mark of Dupont for a polyaramide). In one procedure, a solution of NOMEX or UDEL and the active polymer in a suitable cosolvent is cast onto a glass plate with a casting knife. The plate is partly evaporated and then plunged into water to remove the bulk of the solvent. The membrane sheet is oven dried after soaking.

Representative sample procedures for preparing such functional polymer membranes from the active polymer and the support polymer are summarized in the following Table I.

TABLE I

| Support polymers | rating | How cast | |
|---|---|---|---|
| NOMEX | Good | from | DMA into $H_2O$ |
| | Good | from | DMA + Li salts into $H_2O$ |
| | Fair | from | DMF into $H_2O$ |
| | Good | from | DMF + Li salts into $H_2O$ |
| | Good | from | DMA + Li salts into glycerol/$H_2O$ |
| | Fair | from | F into $H_2O$ |
| | Poor | From | DSO into $H_2O$ |
| UDEL | Fair | from | DMA/phenylethanol into $H_2O$ |
| | Fair | from | DMSO into $H_2O$ |
| | Fair | from | DMA/phenylethanol into methane |
| | Good | from | DMA into $H_2O$ |
| Polypiperazine/ | Fair | from | F into $H_2O$ |
| fumaramide (PDF) | Fair | from | DMA into $H_2O$ |
| [L. Credali et al Desalination 14 137-150 (1974)] | Fair | from | DMA + Li salts into $H_2O$ |

In the above table, the "ratings" were as follows:
good-no holes
fair-some holes
poor-holes, tears
difficult to handle
In the above table:
DMA=dimethylacetamide
DMF=dimethylformamide
F=formamide
DMSO=dimethylsulfoxide Other methods for producing the support which may be used are the following:

(a) Blend with polyvinyl alcohol and cast by evaporation from DMSO, followed by cross-linking with sulfuric acid; or (b) Provide an unsupported active polymer as a thin film within a polyporous support, e.g. a filter paper or microporous TEFLON (the trade mark for a polytetrafluoroethylene of DuPont).

After the functional membrane is fabricated, it may be modified, by one or more of a whole range of surface treatments. For the specific case of cation transport, sulfonation of the membrane with $SO_3$ followed by a KOH quench and washing is useful to improve performance.

It has been found that one optimum form of active membrane may be prepared from polymeric crown ethers on acrylate backbones blended with NOMEX and sulfonated.

DESCRIPTION OF PREFERRED EMBODIMENTS

An embodiment of the generic concept of this invention follows: A membrane was formed from (i) an "active" polymer of acryloyl chloride and an 18-crown-6 derivative, and (ii) a support polymer of the polyaramide type, i.e. NOMEX or one of its very close relatives. A membrane may be cast as a sheet from a mixture of 5–50 wt% of (i) in (ii). This may be achieved by dissolving the support polymer in dimethylacetamide containing LiCl and heating at 120° C. for ½ h. The active polymer is added, stirred not more than 10 min. to dissolve and the resultant "dope" is cast onto a glass plate with a casting knife. The liquid film on the glass plate is then cured for 3 min. at 80° and is then plunged into water/glycerol or water at 0°–20° C. The membrane is extensively washed and stored in water but must be dried once to become active.

The synthesis of one embodiment of an active polymer and its fabrication into membranes will now be described (the Roman numerals refer to the compounds depicted in the scheme which follows at the end of the Example).

Preparation of the polymeric crown ether derivative 2R,3R-N-[N-(benzyloxycarbonyl)-2-aminoethyl]-2-carboxamido-3-carboxyl-1,4,7,10,13,16-hexaoxacyclooctadecane (III)

The crown ether anhydride (I) (20 mmole, 6.68 g) described in L. A. Frederick et al, Can. J. Chem., 59, 1724 (1981) was dissolved in 35 ml of dry tetrahydrofuran, and 15 ml of triethylamine was added followed by addition of the mono-protected diamine (II) (20 mmole, 3.88 g), described in G. J. Atwell et al, Synthesis, 1032, (1984). The mixture was stirred at reflux for 16 h, evaporated to a sludge and redissolved in isopropanol:chloroform (1:3 v/v). The solution was passed down a column of a material known by the Trade Mark REXYN 101 H (H+ form), and the acidic fractions were combined and evaporated to a thick oil. The oil was dissolved in 250 ml of $H_2O$ and extracted with 50 ml portions of petroleum ether and diethyl ether and then exhaustively extracted with dichloromethane. The dichloromethane extract was dried over $Na_2SO_4$ and evaporated to give 10.5 g of the crown ether derivative 2R,3R-N-(N-benzyloxycarbonyl-2-aminoethyl)-2-carboxamido-3-carboxyl-1,4,7,10,13,16-hexaoxacyclooctadecane (quantitative) which was used directly without further purification: $^1HNMR(CDCl_3)$ 7.9 (br, 1H, amide NH). 7.28 (s, 5H, phenyl), 6.1 (br, 1H, NH—CbO), 5.05 (s, 2H, benzyl, $CH_2$), 4.38 and 4.25 (d, 2×1H, $J^{AB}=3$ Hz, methine), 3.8–3.6 and 3.4 (br envelope, 24H, all other H).

2R,3R-N-(2-aminoethyl)-2-carboxamido-3-carboxyl-1,4,7,10,13,16-hexaoxacyclooctadecane hydrochloride (IV)

The CbO derivative (III) (15 mmole, 7.9 g) was dissolved in a mixture of 200 ml of ethanol and 16 ml of 1M hydrochloric acid. This mixture was hydrogenated at 1 atm, at 25° C., over 200 mg of 10% Pd on carbon until gas uptake ceased (375 ml, 15.6 mmole, 16 h). The catalyst was removed by filtration and the filtrate was evaporated to a gum which was triturated to a fine powder with ether (yield 6.3 g, 97%). This sample was hygroscopic and was stored in a vacuum desiccator: $^1$HNMR (D$_2$O) .a4.35 (br s, 2H, methine) 3.8–3.6 (br s, 22H, CH$_2$O and CH$_2$NHC—), 0.3.2 (br t, 2H, CH$_2$—N$^+$H$_3$) Anal. Calc. for C$_{16}$H$_{31}$N$_2$O$_9$Cl; C, 44.59; H, 7.25; N, 6.50; Cl, 8.22. Found: C, 44.35; H, 7.21; N, 6.41; Cl, 8.19.

Poly (acryloyl chloride)

Poly (acryloyl chloride) was prepared by the AIBN-initiated polymerization of acryloyl chloride in benzene solvent and isolated by precipitation into diethyl ether. IR(KBr) 1800 cm$^{-1}$ (vCOC) plus very minor 3500–2500 cm$^{-1}$ (vOH) and 1735 cm$^{-1}$ (vCO$_2$H). A sample converted to the methyl ester had a viscometric molecular weight of 17,000 g/mole. Chloride analysis gave 10.2 mmole COCl/g. Titration gave 21 mmole acid/g implying 10.5 mmole COCl/g.

Poly (2R,3R-N-(N-(propenyl)-2-aminoethyl)-2-carboxamido-3-carboxyl-1,4,7,10,13,16-hexaoxacyclooctadecane)

Poly (acryloyl chloride) (2.2 g, 2.31 mmole COCl) was dissolved in 20 ml of dry dimethylformamide. The crown ether derivative (9.6 g, 22 mmole) was dissolved in 60 ml of dry dimethylformamide and added to the solution of poly (acryloylchoride) with vigorous stirring. Triethylamine (50 ml) was added and the mixture was heated at 60° C. for 16 h. The solvents were removed by evaporation and the resultant gum was dissolved in the minimum volume of 1M hydrochloric acid. The aqueous solution was added dropwise to 1 l of acetone and the insoluble fraction was recovered by filtration. The insoluble materials were redissolved in methanol and evaporated under high vacuum to give an open brittle foam which contained some triethylammonium hydrochloride. The solid was redissolved in water, placed in a dialysis sack, and dialysed versus tap water. On removal of the water, a total of 7.1 g (60% yield) of polymeric crown ether derivative poly(2R,3R-N(N-(propenyl)-2-aminoethyl)-2-carboxamido-3-carboxyl-1,4,7,10,13,16-hexaoxacyclooctadecane was recovered. IR (KBr) 3500–2500 cm$^{-1}$ (vOH), 1735 cm$^{-1}$ (vCONHR) IR of K$^+$ salt KBr) 1580 and 1400 cm$^{-1}$ (vCO$_2$—) 1635 and 1550 cm$^{-1}$ (vCONHR). Analysis gave 5.47% N or 12.95 mmole crown ether/g. Titration with strong base gave 1.85 mmole acid/g.

The process as described above may be summarized by the following scheme:

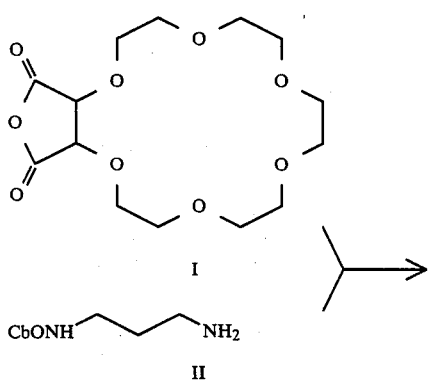

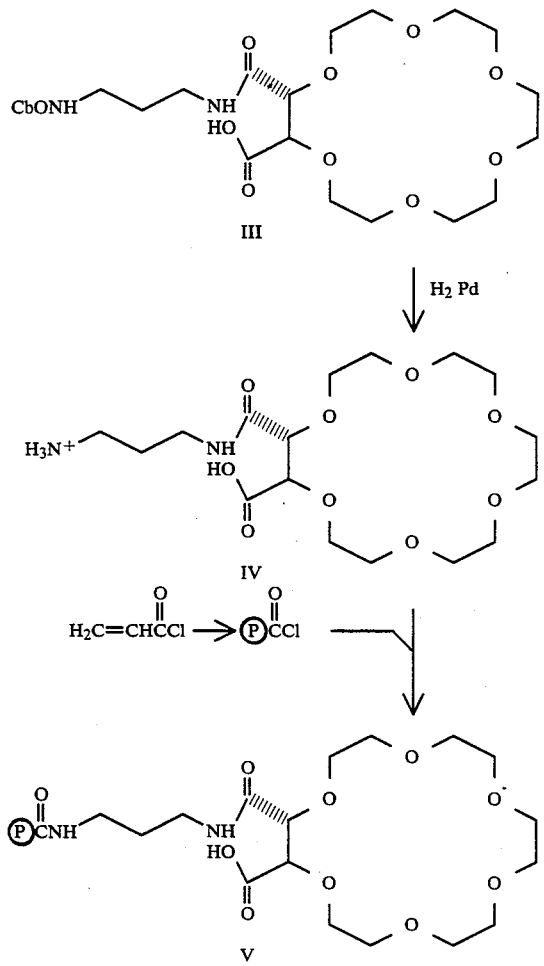

Fabrication of membrane

Lithium chloride (450 mg) was dissolved with heating in 8 mL of dimethylacetamide. To this solution was added a total 1.5 g of NOMEX in small portions. (NOMEX is a registered trade mark of DuPont Inc.). After all the NOMEX had dissolved, the solution was heated at 120° C. for 20 min. The crown ether polymer was dissolved in 1 ml of dimethylacetamide and added dropwise to the NOMEX solution with stirring. The polymer mixture was stirred at 120° C. for an additional time depending on the amount of the crown ether polymer utilized. The following are illustrative:

(a) 15 mg of polymeric crown ether derivative poly(2R,3R-N(N-propenyl)-2-aminoethyl)-2-carboxamido-3-carboxyl-1,4,7,10,13,16-hexaoxacyclooctadecane, 40 min., (1 wt% in final solution);

(b) 75 mg of polymeric crown ether derivative poly(2R,3R-N(N-propenyl)-2-aminoethyl)-2-carboxamido-3-carboxyl-1,4,7,10,13,16-hexaoxacyclooctadecane, 20 min., (5 wt% in solution); and (c) 150 mg of poly polymeric crown ether derivative poly(2R,3R-N(N-propenyl)-2-aminoethyl)-2-carboxamido-3-carboxyl-1,4,7,10,13,16-hexaoxacyclooctadecane, 10 min., (10 wt% in solution).

The mixture was allowed to sit for a brief period without stirring and then was cast onto a glass plate with a casting thickness of 300 micrometers. The glass plate with the film of polymer solution was heated in an oven at 125° C. for 2–5 min. and then immediately immersed, with the polymer film downwards into a bath of cold water. The membrane peeled free of the glass and was allowed to soak overnight in water. When dried in air the final thickness was 30–50 micrometers. This procedure yields a sheet 10×20 cm in area.

The active polymer incorporating crown ether carboxylic acids as the metal ion binding site was prepared as described above. In generic terms, the known crown ether anhydride reacted with the mono protected polylenediamine to give an intermediate which was readily deprotected to yield an amine derivative of the crown ether in excellent overall yield. Poly(acryloyl chloride) was prepared by free radical polymerization of acryloyl chloride. The amine crown ether and the polyacryloyl chloride were coupled to produce the active polymer. The samples utilized had the expected chloride and acid titer (theory: 10.6 mmole/g; found: 10.2 (C), 10.5 (acid) mmole/g and a molecular weight of 17,000 g/mole as the methyl ester). The coupling ultimately gave a sample of the crown ether polymer with 1.85 mmole/g of acid and 1.95 mmole/g of nitrogen. The result is consistent with virtually complete conversion of the COCl groups to crown ether amides. The samples obtained are freely water soluble and titrate as a single species with $pK_a$ 5.0 (varies with supporting electrolyte). All spectroscopic features of the $^1H$, $^{13}C$ and IR spectra are consistent with the structure proposed.

Fabrication into membrane sheets proved to be possible using a variety of techniques. The most highly active and robust membranes were prepared by a phase inversion method from blends of the crown-ether and a support polymer (a polyaramide) Typically, a blend the crown-ether active polymer (1–10 wt%) and NOMEX in dimethylacetamide was cast on a glass plate, the solvent was allowed to evaporate for a brief period and then the polymer film was immersed in water to remove the bulk of the solvent. The membranes prepared by this technique containing small amounts of the crown-ether active polymer (up to 15 wt%) are apparently very similar in structure and properties to the membranes prepared without such active polymer, (see, for example, P. Blais in Reverse Osmosis and Synthetic Membranes, S. Sourirajan, ed, NRCC Publication, Ottawa 1977, pp 167–210). Under the casting conditions utilized, the membranes appear to be free of macroscopic holes (up to x64 by inspection with a binocular microscope) and in cross section appear to be of a "finger" type structure see, for example, M. A. Frommer et al., Ind Eng Chem Prod. Res. Develop, 12, 328, (1973).

OPERATION OF PREFERRED EMBODIMENTS

The results of testing of functional membranes examined in a transport experiment for $K^+$ are shown in the following Table II.

TABLE II

| Systems examined in a transport experiment for $K^+$ | | | | |
|---|---|---|---|---|
| System | Crown | Spacer | Polymer | Support |
| 4a | 1a | 2a | 3a | *NOMEX; UDEL PPF |
| 4b | 1a | 2b | 3a | NOMEX; UDEL |
| 4c | 1a | 2c | 3a | NOMEX |
| 4d | 1a | 2d | 3a | * |
| 4e | 1a | 2e | 3a | * |
| 4f | 1a | 2f | 3a | * |
| 4g | 1b | 2a | 3a | NOMEX |

TABLE II-continued

| Systems examined in a transport experiment for $K^+$ | | | | |
|---|---|---|---|---|
| System | Crown | Spacer | Polymer | Support |
| 4h# ! | 1c | 2a | 3a | NOMEX |
| 4i# ! | 1d | 2a | 3a | NOMEX |
| 4j# ! | 1e | 2a | 3a | NOMEX |
| 4k | 1d | 2a | 3d | & |
| 4l | 1e | 2a | 2d | & |
| 4m | 1a | 2a | 3b | *NOMEX |
| 4n | 1a | 2a | 3b/3c | *NOMEX |
| 4o | 1a | 2a | 3a/3c | *NOMEX |

The "standard" experiment which is summarized in the above table is carried out at 25° C. using a 10 cm$^2$ membrane, as follows:

| $10^{-2}$ M KOH | $10^{-2}$ M HCl |
|---|---|
| $10^{-2}$ M KCl | $2 \times 10^{-2}$ M KCl |

All systems (except !) moved $K^+$ against its gradient while the $H^+$ gradient was still present.

In the column "system" the symbols means as follows:

\#: $Li^+$ tested as well
!: no transport of $K^+$

In the column "support", the symbols mean as follows:

*: unsupported in microporous TEFLON or polypropylene
&: blend with PVA and cross-link In addition to the "standard" experiment of Table II, various brines were processed using the functional membrane of various aspects of this invention; the brines used reflected the composition of brines which are processed in potash production and are proposed for lithium production.

Brine 1-(like Saskatchewan potash Brines)

3.7 mole/l NaCl, initial ratio: Na, 2:K, 1:Ca, 0.02.
1.8 mole/l KCl
0.04 mole/l CaCl$_2$ Brine 2-(like Dead Sea Brines)

4.0 mole/l MgCl$_2$, initial ratio: Mg, 8:Na, 4:K, 1.
2.0 mole/l NaCl
0.5 mole/l KCl Brine 3-(a brine for lithium production)

5 mole/l MgCl$_2$, initial ratio: Mg, 5:Li, 1:Na, 0.13:K, 0.05.
1 mole/l LiCl
0.13 mole/l NaCl Membranes 4a–4c, 4h and 4K, were tested using a cell set up to maintain a constant pH on the brine (source) side of the membrane. The best cases tested as above were:

| Brine 1 | membrane 4a | final ratio: Na,1:K,2:Ca,—. |
| Brine 2 | membrane 4a | final ratio: Mg,0.2:Na,1.8:K,1.0. |
| Brine 3 | membrane 4h | final ratio: Mg,0.4:Li,1:Na,—:K,—. |

There was a considerable amount of preciitation in the experiments with Brine 3 due to the migration of the base into the brine. Nonetheless the transport on the acid side was still well behaved.

A number of experiments designed to elucidate the mechanism of action of the membranes provided within ambits of the present invention have been conducted. While it is not desired to be limited to any presumed mechanism of action, it has been found that cation transport depends to some extent upon the cation concentration in the basic phase and the proton concentration in the acidic phase with relative kinetic orders of 1:1. Anion transport also occurs and depends to some extent upon the concentrations of anions and protons in the acidic phase and inversely upon the basic phase cation concentration with relative kinetic orders of 1:1:2. The transport mechanism rate is thus apparently limited by the hopping of ions between adjacent crown either sites within the membrane. The membrane is essentially non-selective for anion transport but exhibits cation selectivity typical of the crown ether moiety.

SUMMARY

From the foregoing description, one skilled in the art can easily ascertain the essential characteristics of this invention, and without departing from the spirit and scope thereof, can make various changes and modifications of the invention to adapt it to various uses and conditions. Consequently, such changes and modifications are properly, equitably, and intended to be within the full range of equivalents of the following claims.

I claim:

1. A functional membrane for proton-driven ion transport consisting essentially of a blend of
    (a) an active polymer having cation-binding sites, said cation binding sites being provided by a member selected from the group consisting of a crown ether, a cryptand and an acyclic complexone each of said members having an ionizable acidic site which is provided by a member selected from the group consisting of a carboxylic acid, a sulfonic acid and a phenol, said active polymer being incorporated into a polymer backbone via a spacer component; and
    (b) a support polymer selected from the group consisting of polyaramides, polysulfones, and polypiperazine-fumaramides;
thereby to provide a membrane whose constituents consist of said components (a) and (b).

2. The functional membrane of claim 1 wherein said active polymer comprises: a polymeric crown ether whose components consist of a crown ether component, a spacer component and a polymer backbone component, said crown ether component bearing a carboxylic acid group or, together with said polymer backbone component, producing a carboxylate group.

3. The functional membrane of claim 1 wherein said active polymer comprises: a copolymer selected from the group consisting of a crown ether with a polymeric acid chloride, and a crown ether with a polymeric cyclic anhydride.

4. The functional membrane of claim 3 wherein said polymeric acid chloride is selected from the group consisting of polyacryloyl chloride, an acryloyl chloride-styrene copolymer, and an acryloyl chloride-methacrylate copolymer.

5. The functional membrane of claim 3 wherein said polymeric cyclic anhydride is selected from the group consisting of a copolymer of maleic anhydride with ethylene, a copolymer of maleic anhydride with methyl ether, and a copolymer of maleic anhydride with styrene.

6. The functional membrane of claim 1 wherein said crown ether component is selected from the group consisting of a crown ether and an acyclic relative thereof.

7. The functional membrane of claim 1 wherein said polymer backbone component is selected from the group consisting of an acryloyl polymer, a methacryloyl polymer, a styryl polymer and a copolymer of maleic anhydride with ethylenes.

8. The functional membrane of claim 1 wherein said support polymer is backed by a porous support.

9. The functional membrane of claim 8 wherein said spacer component is selected from the group consisting of:

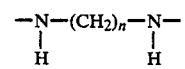

wherein n is 2, 3, 6 or 10;

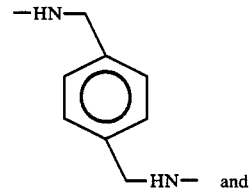 and

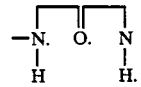

10. The functional membrane of claim 1 in which said support polymer is a polyporous support member.

11. The functional membrane of claim 1 in which said support polymer is cast from a solvent by phase inversion.

12. The functional membrane of claim 11 wherein said casting is selected from one of the following:
    (a) from a dimethylacetamide into water;
    (b) from dimethylacetamide and lithium salts into water;
    (c) from dimethylformamide into water;
    (d) from dimethylformamide and lithium salts into water;
    (e) from dimethylacetamide and lithium salts into glycerol/water;
    (f) from formamide into water;
    (g) from dimethylsulfoxide into water; and
    (h) from dimethylacetamide/phenylethanol into water.

13. A functional membrane for proton-driven ion transport consisting essentially of a blend of:
    (a) an active polymer having cation-binding sites, said cation binding sites being provided by polymeric crown ether whose components consist of a crown ether component, a spacer component and a polymer backbone component, said crown ether component bearing a carboxylic acid group or, together with said polymer backbone component, producing a carboxylate group, said crown ether component comprising a copolymer of a crown ether selected from the group consisting of:

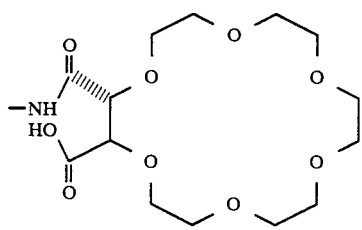

(designated 1a),

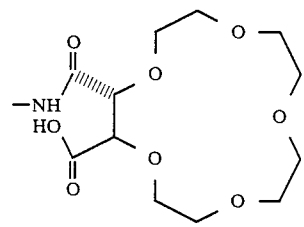

(designated 1b),

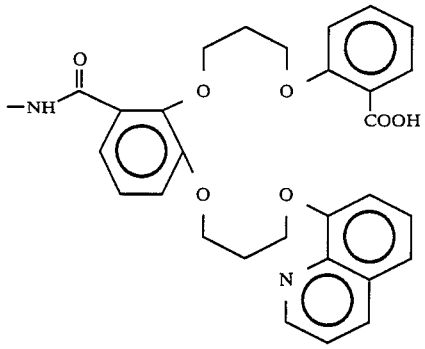

(designated 1c),

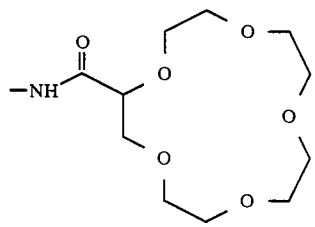

(designated 1d), and

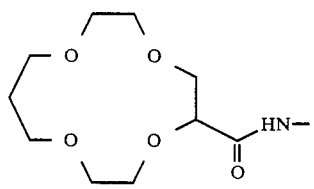

(designated 1e)

with a member selected from the group consisting of a polymeric acid chloride, and a polymeric cyclic anhydride, said active polymer being incorporated into a polymer backbone via a spacer component; and (b) a support polymer selected from the group consisting of polyaramides, polysulfones, and polypiperazine-fumaramides;

thereby to provide a membrane whose constituents consist of said components (a) and (b).

14. The membrane of claim 13 wherein said support polymer is a polyaramide.

15. The membrane of claim 13 wherein said support polymer is a polysulfone.

* * * * *